Sept. 20, 1966 C. THUMIM 3,273,453
VARIABLE BACK GAUGE TRAVEL ADJUSTMENT MEANS FOR
GUILLOTINE TYPE CUTTING MACHINE
Filed Aug. 19, 1963 3 Sheets-Sheet 1

INVENTOR.
CARL THUMIM
BY
OSTROLENK, FABER, GERB & SOFFEN
ATTORNEYS

Sept. 20, 1966                C. THUMIM                3,273,453
         VARIABLE BACK GAUGE TRAVEL ADJUSTMENT MEANS FOR
                 GUILLOTINE TYPE CUTTING MACHINE
Filed Aug. 19, 1963                              3 Sheets-Sheet 2

FIG. 2

INVENTOR.
CARL THUMIM
BY
OSTROLENK, FABER, GERB & SOFFEN
ATTORNEYS

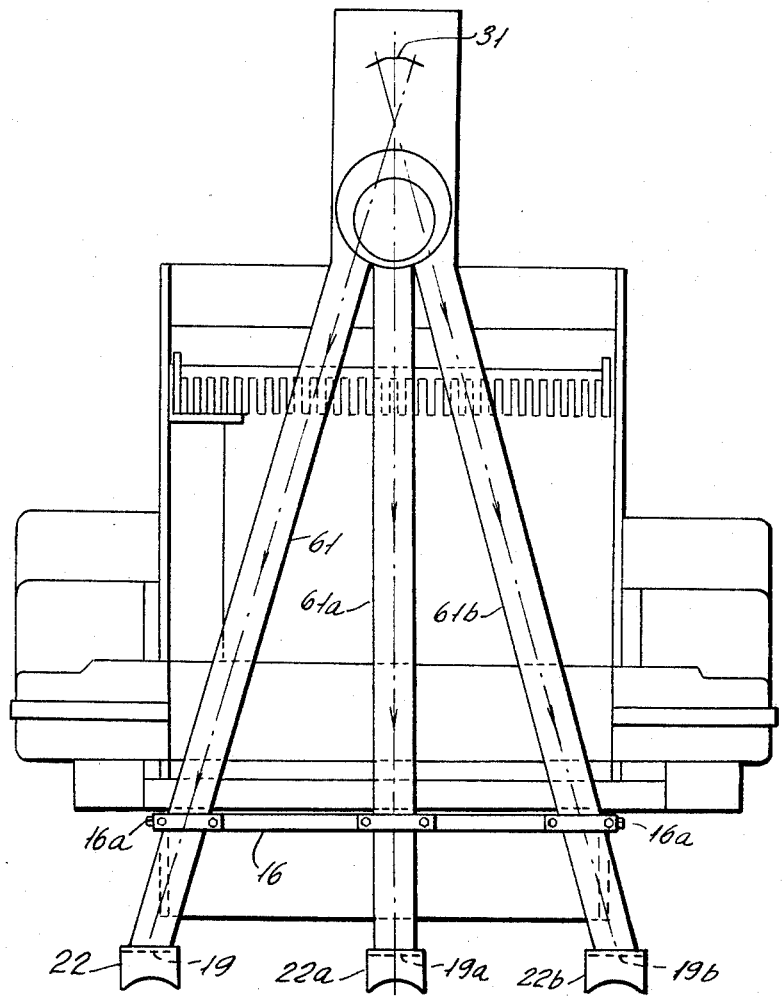

United States Patent Office 3,273,453
Patented Sept. 20, 1966

3,273,453
VARIABLE BACK GAUGE TRAVEL ADJUSTMENT MEANS FOR GUILLOTINE TYPE CUTTING MACHINE
Carl Thumim, Chicago, Ill., assignor to Miehle-Goss-Dexter, Incorporated, Chicago, Ill., a corporation of Delaware
Filed Aug. 19, 1963, Ser. No. 304,717
10 Claims. (Cl. 88—24)

This invention relates to paper cutting machines, and is more particularly concerned with an optical projecting system for ascertaining the back gauge position from either of three positions at the front of a paper cutting machine.

Reference is made to my copending application Serial No. 15,228, filed on March 15, 1960, now abandoned, for "Paper Cutting Machines." The problem of indicating to the operator of a paper cutting machine the exact location by coarse and fine measurement, of the back gauge so that he may know the length of the cut about to be made has always been difficult. The usual prior art arrangement is to fasten a calibrated scale or measuring collar to the lead screw of the back gauge adjacent the hand wheel at about operator waist level. This scale indicates the fractional part of a turn that the lead screw makes and thus indicates the fine portion of the measurement. For the purpose of obtaining the coarse measurement, a measuring tape is attached to the back gauge and brought forward past a fiducial mark at about the operator face or eye level while standing. The tape is marked in a manner to read both inches and coarse fractions of an inch. This type of indicating requires the operator to look upwardly for the coarse measurement, and downwardly at the scale of the fine measurement, rather cumbersome and time-consuming operation.

In accordance with the present invention, the presentation of both coarse and fine measurements of the cut about to be taken is projected to three localities, for example, at either side or middle of the front of the machine, generally at face or operator eye level while standing, and optically enlarged to effectively preclude the difficulties described above.

An object of the invention is to effect a projected image of fine and coarse measuring indicators which represent the linear distance between the back gauge and the cutting edge of the knife.

Another object is to effect an eye level magnified visual representation in inches and fractions of inches of the linear distance between the back gauge and the edge of the cutter knife to an operator standing at the front of a paper cutting machine.

A further object is to provide plural indicating scale elements for respective fine and coarse measurement, to at least three localities of the front of the paper cutting machine, which coact with the lead screw so that projected images of the scales accurately represent the amount of rotation of the lead screw which is proportional to the linear movement of the back gauge.

Briefly, the invention comprises, the use of a pair of concentric transparent dial scales geared to each other at a fixed ratio, being coupled by gears or other means to the back gauge lead screw for rotation proportional to back gauge movement. One dial reads coarse adjustment and the other reads fine, the gearing ratio being commensurate with the respective scale calibration of the dials. Thus, one dial has a scale reading in inches and the other reads in fractions of an inch. The dials readings are disposed on viewing screens at the general eye level of an operator, while standing, and by means of suitable illumination cooperating with a compound lens and mirror system the pertinent portions of the dial scales are magnified and projected to three viewing translucent screens directly in front of the operator at general face level while standing. The greatly magnified images are thus quickly and conveniently readable as to coarse and fine gauge increments in any suitable manner as desired. In this invention, indicator dial scales having respective coarse and fine circumferential scales, graduated in the U.S. inch system, and are disposed at the rear of the machine and coupled thereto as shown in FIGURE 2. The readings of the scales are projected upwardly and forwardly to three face level viewing screens through a reflecting light ray system including a light source, condenser lenses, lens system means, a triple plane mirror means and a plurality of reflective viewing screens.

A detailed description of my invention will now be given in conjunction with the appended drawing in which:

FIGURE 2 shows an exemplary novel structural arrangement of instrumentalities for projecting fine and coarse scale readings from the back of the machine upward and forward to the front of the machine.

Figure 3:
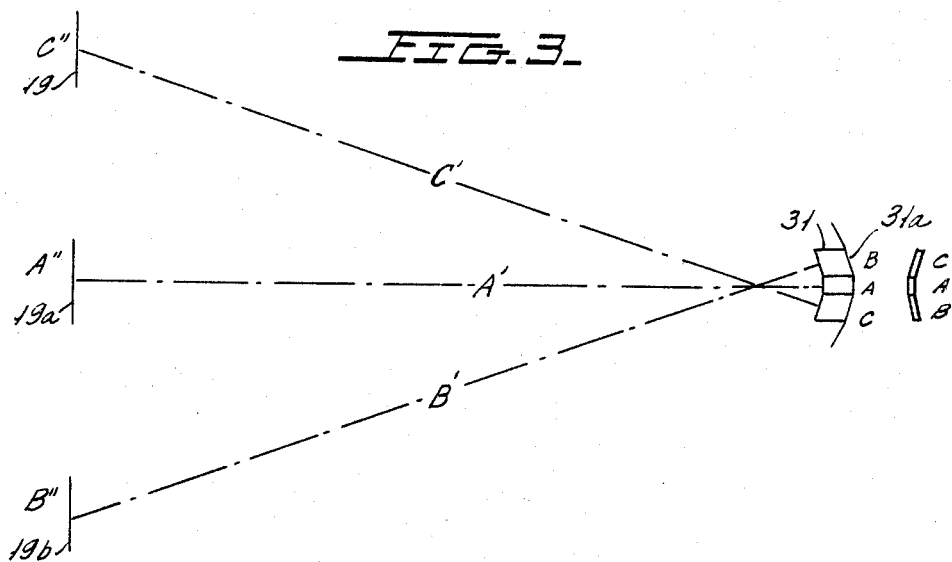

FIGURE 3 shows in plan view the upper horizontal portion of a distributed light beam being deflected from a connected triple mirror means to three viewing positions at the front of the paper cutting machine; and FIGURE 4 is a plan view of a schematic paper cutting machine having the light ray tubes and viewing screens mounted thereon to receive the projection of the light rays from the triple mirror means to the three viewing positions at the front of the paper cutting machine.

Referring generally, to the drawing, FIGURES 1–4 a partial section of a paper cutting machine is shown in FIGURE 2 having a paper bed or frame 10 with a lead screw 12 below which will be understood to actuate a back gauge (not shown) on the upper surface of frame 10.

Figure 1:
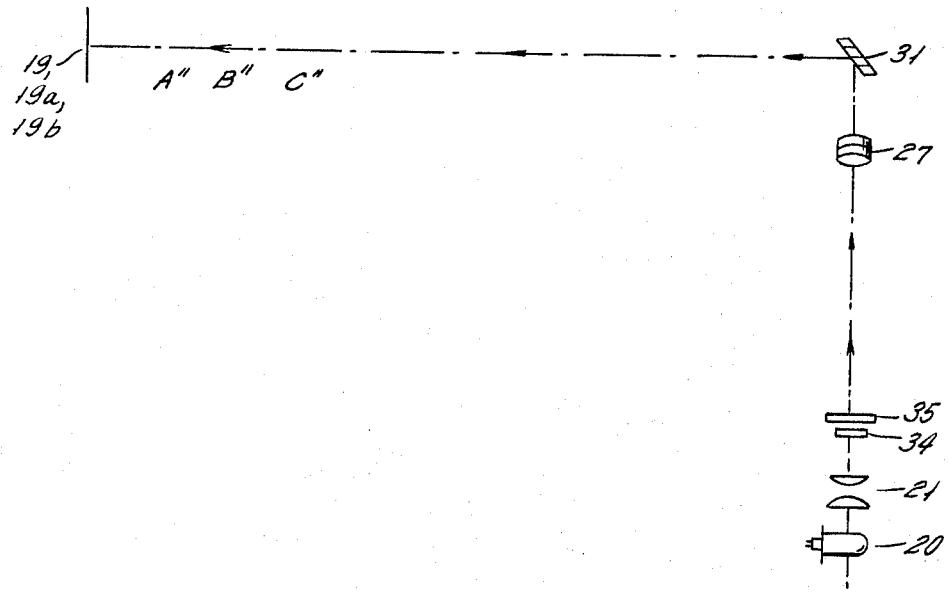
FIGURE 1 is a view in elevation of the light ray path of scale projections from back of the paper cutting machine upward and forward to the front of the machine at eye level to be viewed by the operator.

FIGURE 1 shows in elevation the correlation of a set of measuring dial scales 34 and 35, operated by a lead screw 12 of a back gauge, which scales are in the light rays of the lens optical system as shown. FIGURE 1 shows a light source 20 which passes its light rays through double condensing lens 21 which passes through transparent measuring dial scales 34 and 35 and lens system means 27 which magnifies the light ray and directs it against triple mirror plane means 31 which selectively separates the images and directs the light rays to their three respective positioned viewing screens 19, 19a and 19b at the front of the paper cutting machine as indicated in FIGURE 4.

FIGURE 2 shows the novel correlated instrumentalities of the dial scale measuring means including gear means connected to lead screw 12, light source 20, condensing lens means 21 being held by gear box means 22 in relation to transparent dial scales 34 and 35. After the light ray passes through scales 34 and 35 the light is concentrated and magnified, as it passes compound lens system 27 to triple mirror means 31 which is reflected to viewing screens 19, 19a and 19b. Lens means 27 consists of components 27a and 27b held in lens mount 29 secured in spaced relationship to housing 63, as shown in FIGURE 2.

In FIGURE 2 the lead screw 12 drives shaft 37 by gears means 11 and 11a. However, if desired, lead screw 12 may be extended to drive shaft 37 by belt and pulley means as indicated in broken lines in FIGURE 2.

The optical system generally comprises lens 21 held in housing means 22 by bolt means 17a which is connected by housing support 60 to paper machine table 10 by bolt means 17; lens means 27 held in light housing means 63; triple plane mirror means 31 held in spaced relationship by any suitable means in housing 63, which is connected by light tubes 61, 61a and 61b to light shields 22, 22a and 22b containing translucent ground glass screens 19, 19a and 19b, respectively. Support means 16 supports light tubes 61, 61a and 61b in FIGURES 2 and 4, each of which are made of two telescoping tubes for adjustment as shown in FIGURE 2. Where the beam of light is sufficiently intense, the tubes may be omitted.

Referring more specifically to FIGURE 2, dial scale 34 measures the fine movement of the back gauge through lead screw 12 geared to shaft 37. Dial scale 34 is of less diameter than dial scale 35 and is placed below dial 35 which measures coarse movement of lead screw 12 and the back gauge. Transparent or translucent dial scales 34 and 35 are illuminated by light rays from a light source 20 suitably mounted below the dials or scales 34 and 35, respectively. Scale 34 is fixedly mounted on a shaft 37 by means of a collar 40 to which it is riveted as shown. At the lower end of the shaft 37 is fixedly mounted a gear 11a and at the other end of the shaft is fixedly mounted a pinion 46 which engages a gear 49 fixedly attached to an idler shaft 52 which also fixedly carried a pinion 55 so that gear 49 and pinion 55 turn in unison. Pinion 55 in turn engages a gear 58 which is fixedly attached by means of a collar 61 to dial scale 35 causing dial scale 35 to turn freely on shaft 37 at some submultiple of dial scale 34. Suitable bearing means for shafts 37 and 52 are carried by gearbox 22 and plate means 25. The turning of dial scale 35 at a submultiple of dial scale 34 allows dial scale in effect to keep track of the number of turns dial scale 34 has made. Thus, dial scale 34 is graduated and calibrated in quadrants, each quadrant reading 0–16. Dial scale 35 is graduated and calibrated in consecutive inches for its full periphery. The fine measurement dial scale 34 is calibrated in 0–16 quadrants and rotates 90° per rotation of screw 12. For a one-inch division movement on coarse measurement (1″ per division) dial 35 there is correspondingly only one quarter of a turn ($^{10}\!/_{16}$) made in dial 34 representing the same one inch of travel of the back gauge. In any instance, each pinion and gear combination have suitable ratios for the desired type of readings in accordance with scale graduations and calibrations. It is to be understood, that the above measuring means of dial scales 34 and 35 is not limited to the U.S. inch measurement but by substitution of proper gear ratios therein may be calibrated in the European metric system in millimeters and the like of travel of the back gauge, if desired.

FIGURE 3 shows the path of light rays as reflected from triple plane surface mirror 31 to viewing screens 19, 19a and 19b.

FIGURE 4 shows a paper cutting machine F and relative positions of casing 63, light tubes 61, 61a and 61b with respect to the emanated light rays from triple plane mirror means 31 and arcuate holder means 31a of FIGURE 2, which reflects its light rays to three viewing positions at the front of the paper cutting machine which are registered on viewing screens 19, 19a and 19b in light shield means 22, 22a and 22b respectively, in FIGURE 4. Tubes 61, 61a and 61b are supported at the front of paper cutting machine F by support means 16 fastened at the sides of paper table 10 by bolt means 16a, as shown in FIGURES 2 and 4.

Having thus described my invention, I am aware that various changes may be made without departing from the spirit and scope thereof and, accordingly, I do not seek to be limited to the precise illustration herein given except as set forth in the appended claims.

The embodiments of the invention in which an exclusive privilege or property is claimed are defined as follows:

1. In a paper cutting machine, a back gauge indicator comprising an optical projecting means and a plurality of dials coacting to produce an image of said dials disposed generally at operator eye level, a lead screw and a gear means connected thereto to rotate said dials proportionately to rotation of said lead screw.

2. In a paper cutting machine, a back gauge, a rotative lead screw coacting with said back gauge to move said back gauge, a plurality of indicator elements, said indicator elements being connected by a gear means to said lead screw so that linear movement of said back gauge is indicated by rotational degree of movement of said indicator elements, an optical presenting means coacting with said indicator elements to effect a visible scale measurement at generally operator eye level of the amount of back gauge movement.

3. In a device as set forth in claim 1, said optical projecting means comprising a plurality of lens optical presenting means to magnify portions of the indicating elements.

4. In a paper cutting machine, a back gauge indicating means effecting coarse and fine adjustment comprising an optical projecting means and a plurality of indicia means, said indicia means coacting with the optical means to produce respective images of said indicia means, a back gauge lead screw and positive drive actuating means responsive to movement thereof to actuate said indicia means proportionately to said lead screw movement, said optical reproducing means having a plurality of receiving screens disposed generally at operator eye level.

5. In a paper cutting machine having a back gauge, a lead screw, a back gauge indicating means comprising a plurality of indicator elements for indicating coarse and fine adjustment of said back gauge, said lead screw actuating said back gauge and geared to said indicating elements to provide an indication of coarse and fine adjustment of said back gauge position; an optical projecting means including a lens system and triple mirror means to present said indication at a plurality of predetermined points adjacent the eye level of an operator.

6. In a paper cutting machine, a back gauge indicating means comprising a plurality of rotary indicating elements having respective scales for coarse and fine measurement, a back gauge, a lead screw for actuating said back gauge and said indicating elements, said indicator elements being geared to each other in predetermined ratio for effecting coarse and fine readings commensurate with respective scales and coacting with said back gauge lead screw to indicate back gauge position, an optical projecting system so arranged as to present an image of said scales generally at operator eye level.

7. In a paper cutting machine having a back gauge and a lead screw to effect motion thereof, an indicating scale means for apprising an operator of the position of the back gauge, said means comprising a pair of coaxial dials, means for mounting said dials at the back of said machine, gear means coupling said dials to effect rotation at different rates so as to indicate fine and coarse back gauge adjustment, means connecting said lead screw with said dials to effect rotation of said dials responsive to rotation of said lead screw, an optical projecting system including light means, a plurality of lens systems and a cooperating triple mirror means arranged as three connected planes to present an image of the scales at three positions to an operator at the front of the paper cutting machine.

8. In a device as set forth in claim 7, one of said dials being calibrated for coarse reading and the other calibrated for fine reading, one dial being of lesser diameter and disposed forwardly of the other reading dial.

9. In a device as set forth in claim 8, said fine reading dial having a plurality of identical sets of indicia thereon, said plurality of sets being equal in number to a predetermined ratio of gearing intermediate said lead screw and said fine reading dial.

10. In combination, a measuring means and optical viewing system for determining back gauge position in paper cutting machines comprising a back gauge and a lead screw to effect motion thereof, a plurality of cooperating indicating scale means for apprising an operator of the position of the back gauge, said scale means comprising a pair of coaxial graduated dial scale means, structural means and gear means for mounting dial scale means at the back of said machine, proportional gear means intercoupling said dial scales means so as to effect rotation of said dial means at different rates so as to indicate fine and coarse measurement of back gauge travel adjustment, gear means connecting said lead screw with said dial scale means to effect rotation of said dial scales means to be responsive to rotation of said lead screw, an optical projecting system including light source means, a plurality of hood and viewing screen means, and a cooperating triple mirror means arranged as three connected planes in an arc holder to present light rays through said scale means in said optical system as a respective measured position of the back gauge to an operator at three positions at the front of the paper cutting machine.

References Cited by the Examiner

UNITED STATES PATENTS

| | | | |
|---|---|---|---|
| 1,947,155 | 2/1934 | Fuller | 88—24 |
| 2,191,045 | 2/1940 | Slayton | 88—24 |
| 2,392,461 | 1/1946 | Clifton et al. | 88—24 X |
| 2,916,801 | 12/1959 | Lyttle | 214—1.6 |
| 3,053,143 | 9/1962 | Meier | 88—24 |

OTHER REFERENCES

VEB German Printed Application, No. 1,095,252, published 12–22–60.

NORTON ANSHER, *Primary Examiner.*

H. H. FLANDERS, *Assistant Examiner.*